(12) United States Patent
Howard et al.

(10) Patent No.: US 10,041,614 B2
(45) Date of Patent: Aug. 7, 2018

(54) PIPE CONNECTION HAVING A REVERSE HUB

(75) Inventors: Erik M. Howard, Baytown, TX (US); Rajeev Madazhy, Baytown, TX (US)

(73) Assignee: Taper-Lok Corporation, Houston, TX (US)

( * ) Notice: Subject to any disclaimer, the term of this patent is extended or adjusted under 35 U.S.C. 154(b) by 1112 days.

(21) Appl. No.: 12/724,947

(22) Filed: Mar. 16, 2010

(65) Prior Publication Data
US 2010/0237614 A1    Sep. 23, 2010

Related U.S. Application Data

(60) Provisional application No. 61/161,302, filed on Mar. 18, 2009.

(51) Int. Cl.
*F16L 23/032* (2006.01)
*F16L 23/028* (2006.01)

(52) U.S. Cl.
CPC ......... *F16L 23/032* (2013.01); *F16L 23/0283* (2013.01)

(58) Field of Classification Search
USPC ............ 285/272, 275, 278, 280, 281, 913
See application file for complete search history.

(56) References Cited

U.S. PATENT DOCUMENTS

| | | | |
|---|---|---|---|
| 1,267,313 A * | 5/1918 | Cook | 285/330 |
| 2,303,311 A * | 11/1942 | Gredell | 285/331 |
| 2,940,779 A | 6/1960 | Bruno | |
| 3,078,110 A * | 2/1963 | Starr | 285/336 |
| 3,258,281 A * | 6/1966 | Scott et al. | 285/328 |
| 3,278,202 A * | 10/1966 | Smith | 285/50 |
| 3,387,867 A * | 6/1968 | Rogers | 285/336 |
| 3,603,617 A * | 9/1971 | Lochridge | 285/24 |
| 3,620,554 A * | 11/1971 | Delbert et al. | 285/18 |
| 4,052,990 A * | 10/1977 | Dodgson | 128/207.14 |
| 4,214,763 A * | 7/1980 | Latham | 277/614 |
| 4,281,856 A * | 8/1981 | Litman et al. | 285/15 |
| 4,525,001 A * | 6/1985 | Lumsden et al. | 285/328 |
| 4,629,221 A * | 12/1986 | Lumsden et al. | 285/328 |
| 5,230,540 A | 7/1993 | Lewis | |
| 5,553,753 A * | 9/1996 | Abplanalp | 222/387 |
| 5,636,875 A * | 6/1997 | Wasser | 285/21.1 |
| 6,070,912 A * | 6/2000 | Latham | 285/61 |
| 6,199,916 B1 * | 3/2001 | Klinger et al. | 285/288.1 |

(Continued)

FOREIGN PATENT DOCUMENTS

GB     508747     7/1939

*Primary Examiner* — Matthieu F Setliff
*Assistant Examiner* — James A Linford

(57) ABSTRACT

A pipe connection in which at least one of the flanges has a reverse hub between the outer portion of the flange and the inner portion of the flange that extends outward to form to the weld neck. The reverse hub tapers down toward the sealing face of the flange, rather than away from the face of the flange. This taper may follow a spline curve which is empirically determined to reduce stresses that are caused by rotation of the outer portion of the flange around the gasket. The reverse hub eliminates material that would be required for a positive hub and thereby reduces the weight of the flange. By reducing the stresses resulting from rotation of the outer portion of the flange around the gasket, the thickness of the flange may also be reduced, further reducing the weight of the flange.

5 Claims, 4 Drawing Sheets

(56) References Cited

U.S. PATENT DOCUMENTS

| | | |
|---|---|---|
| 6,361,085 B2 * | 3/2002 | Nguyen .................... 285/368 |
| 6,485,063 B1 * | 11/2002 | Olivier ..................... 285/333 |
| 7,686,348 B2 * | 3/2010 | Hatass et al. ............ 285/288.1 |
| 7,695,392 B2 * | 4/2010 | Isken et al. ............... 475/230 |
| 2001/0000225 A1 | 4/2001 | Nguyen |
| 2002/0008387 A1 * | 1/2002 | Vasudeva .................. 285/405 |
| 2005/0285393 A1 * | 12/2005 | Hatass et al. ............. 285/305 |

\* cited by examiner

PIPE CONNECTION HAVING A REVERSE HUB

CROSS-REFERENCE TO RELATED APPLICATIONS

This application claims the benefit of U.S. Provisional Patent Application 61/161,302, filed Mar. 18, 2009, which is incorporated by reference as if set forth herein in its entirety.

SUMMARY

This disclosure is directed to an improved design for a pipe connection that can reduce the size and weight of large, high-pressure pipe connections, thereby making the connections smaller, lighter, less expensive, and easier to manufacture, transport, install and assemble. The pipe connection incorporates one or more flange members that have reverse hubs between the outer portions of the flanges and the corresponding weld necks.

One embodiment comprises a pipe connection that includes a first flange member, a second flange member and means for securing the first flange member to the second flange member. Each of the first and second flange members includes an inner portion (318) and an outer flange portion (319) which are substantially symmetric about an axis through the flange member. The inner portion extends from a sealing surface (313) at a forward end (FIG. 4, 311) of the flange member to a forward end (361) of a weld neck at a rear end (314) of the flange member. The outer flange portion surrounds the inner portion and is connected to the inner portion. At least one of the first and second flange members has a reverse hub which connects a rear surface (312) of the outer flange portion to the weld neck. The reverse hub tapers from a larger diameter (332) at the outer flange portion to a smaller diameter (331) at the weld neck, where the smaller diameter (332) is forward of the larger diameter (331) (i.e., closer to the face of the flange member). The taper of the reverse hub may follow a spline curve (such as a smooth curve 330 that has no breaks, discontinuities or irregularities) that substantially minimizes stresses between the inner portion and outer flange portion. In one embodiment, the means for securing the first flange member to the second flange member comprises a set of bolts and corresponding nuts that are positioned in bolt holes through the flange members and are tightened to secure the flange members to each other. The bolts may be staggered axially.

An alternative embodiment comprises a single flange member that includes an inner portion and outer flange portion that are substantially symmetric about an axis through the flange member. The inner portion extends from a sealing face at a forward end of the flange member to a weld neck at a rear end of the flange member. The outer flange portion surrounds the inner portion and is connected to the inner portion. A rear surface of the outer flange portion is connected to the weld neck by a reverse hub that tapers from a larger diameter at the outer flange portion to a smaller diameter at the weld neck, where the smaller diameter is forward of the larger diameter (i.e., closer to the face of the flange member). The taper of the reverse hub may follow a spline curve. The flange member may have bolt holes through the outer flange portion to allow the flange member to be secured to another flange member. The flange member may alternatively be configured to be secured to the other flange member using a clamp or other connecting means.

Another alternative embodiment comprises a pipe section having a flange member on one end of the pipe section. The flange member includes a sealing face at a forward end of the flange member and an outer flange portion which is configured to be secured to another flange member. A rear end of the flange member is connected to the pipe section of pipe (e.g., by welding). The rear surface of the outer flange portion is connected to the section of pipe by a reverse hub that tapers from a larger diameter at the flange member to a smaller diameter at the section of pipe, wherein the smaller diameter is forward of the larger diameter (i.e., closer to the face of the flange member).

BRIEF DESCRIPTION OF THE DRAWINGS

Other objects and advantages of the invention may become apparent upon reading the following detailed description and upon reference to the accompanying drawings.

Figure 1:
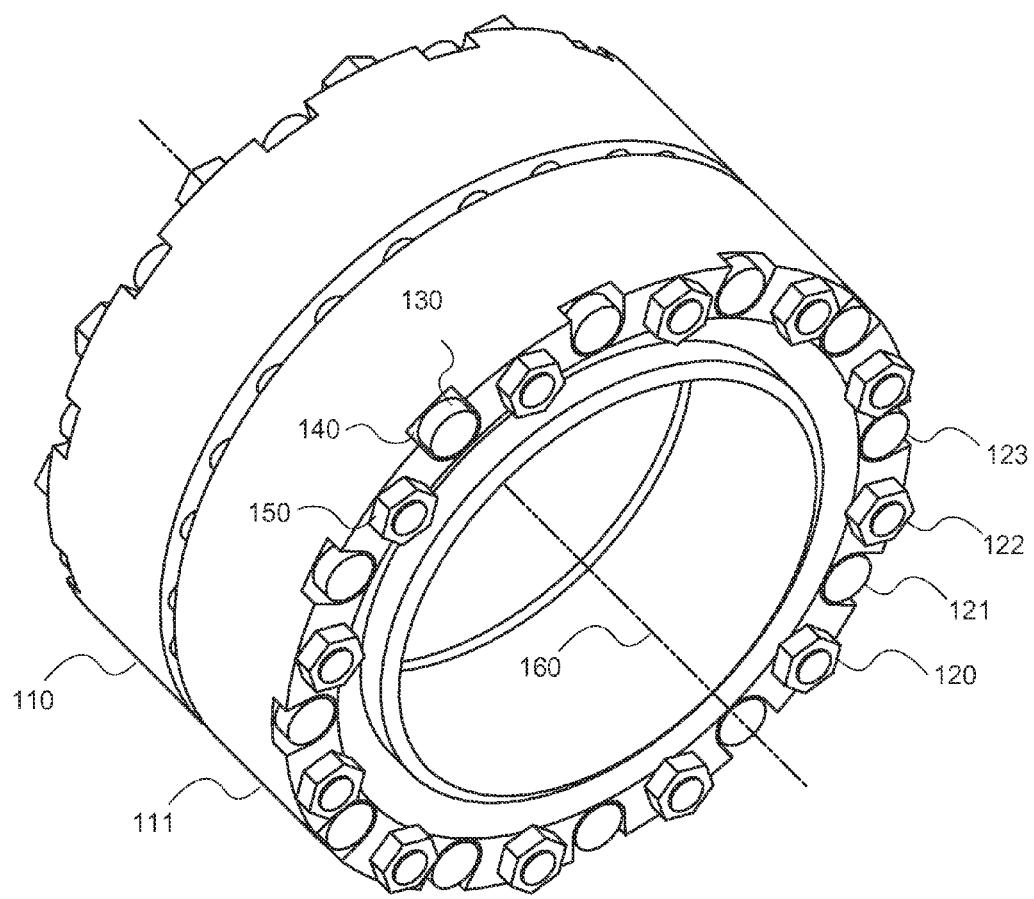
FIG. 1 is a perspective view of an exemplary pipe connection.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DESCRIPTION OF EXEMPLARY EMBODIMENTS

An improved design for a pipe connection is disclosed herein. This design can reduce the size and weight of large, high-pressure pipe connections, thereby making the connections smaller, lighter, less expensive, and easier to manufacture, transport, install and assemble.

Embodiments of the pipe connection may incorporate two distinct, unique features. First, the connection may incorporate a reverse spline hub between the outer portions of the flanges and the corresponding weld necks. Second, the connection may be configured so that the bolts that secure the two flanges of the connection together are staggered.

Pipe connections that are secured by bolts are only as strong as the bolts that hold the flanges together. The strength of the bolts is directly related to the cross-sectional area of the bolts. There are well-known calculations that are conventionally used to determine the bolt area that is required to meet the design goals of the connection. The bolt area drives the size and number of the bolts that are required to secure the connection.

Large, high-pressure connections normally require many bolts to secure the flanges of the connection to each other. Conventionally, the bolts are arranged in a circular pattern around the flanges. This is referred to as the "bolt circle".

In a conventional connection, the flanges of the connection have all of the bolts at symmetric positions. That is, the bolts are identically positioned axially (i.e., in the direction of the connection's axis), but they are angularly displaced (with respect to the axis of the connection) on the bolt circle. Because it is necessary to provide some spacing between the bolts in order to maintain the flanges' integrity and to provide enough space to tighten the bolts, it is typically necessary to increase the size of the flanges (i.e., increase their diameters) in order to increase the bolt circle and thereby accommodate all of the necessary bolts. This increases the weight and the cost of the connection.

Increases in the size of the bolt circle also affect the stresses on the flanges. The connection typically includes a gasket that is positioned between the flanges. The gasket is normally positioned near the inner diameter of the connection. Because the bolt circle is larger than the gasket diameter, the tightening of the bolts causes the outer portions of the flanges to flex, rotating or pivoting around the gasket. The ratio of the bolt circle to the gasket diameter is referred to as the "moment arm" of the connection.

As the moment arm of the connection increases, the stresses that are placed on the flanges increase. Conventionally, it is necessary to increase the thickness of the flanges in order to withstand the increased stress. Thus, according to conventional design principles, increased bolt area leads to an increased bolt circle, which increases the moment arm, leading to increased thickness, weight and cost.

In one embodiment of the present connection, at least one of the flanges has a reverse hub between the outer portion of the flange and the inner portion of the flange that extends outward to form to the weld neck. The reverse hub tapers down toward the sealing face of the flange, rather than away from the face of the flange. This taper is a spline which is empirically determined to reduce stresses that are caused by rotation of the outer portion of the flange around the gasket. The reverse hub eliminates material that would be required for a positive hub and thereby reduces the weight of the flange. Further, because the stresses resulting from rotation of the outer portion of the flange around the gasket are reduced, the thickness of the flange can be reduced, thereby further reducing the weight of the flange.

Referring to FIG. 1, a perspective view of an exemplary connection is shown. It can be seen that the two flanges (110, 111) are secured to each other by a plurality of bolts (e.g., 120-124). It can also be seen that the flanges incorporate recesses which allow alternate ones of the bolts to be displaced axially with respect to their neighbors. Thus, the head of a bolt (e.g., 130) can be positioned within a recess (e.g., 140) so that it does not interfere with the tightening of a nut (e.g., 151) on an adjacent bolt. In this embodiment, the seats for half of the bolts are on a first plane, while the seats for the remainder of the bolts are on a second plane.

In this embodiment, successive bolts are oppositely oriented so that, for a first bolt, the head is seated against a first one of the flanges and the corresponding nut is seated against the second one of the flanges, while for the adjacent bolt, the head is seated against the second flange and the corresponding nut is seated against the first flange. It should be noted that adjacent bolts need not be oriented in opposite directions if they can nevertheless be tightened on opposite ends (e.g., a wrench tightens the nut on a first bolt, and tightens the heads of adjacent bolts).

Figure 2:
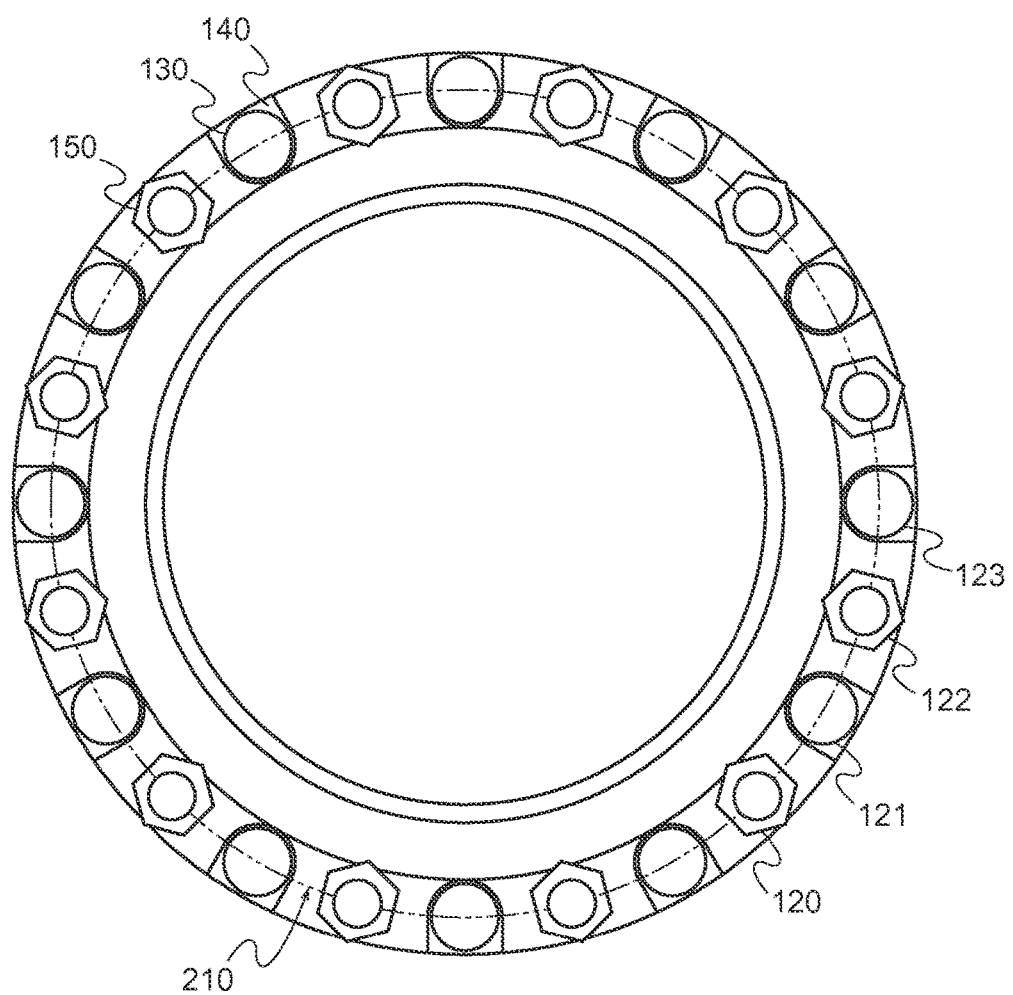
FIG. 2 is an end view of the pipe connection of FIG. 1 showing the bolt configuration of the connection.

Referring to FIG. 2, an end view of the connection is shown. In this figure, the axis of the connection is orthogonal to the page. It should be noted that, while the bolt heads are depicted in FIGS. 1 and 2 as being round, they may also be hexagonal or otherwise shaped to prevent the bolts from rotating when seated in the recesses. It can also be seen that the bolts are regularly spaced on bolt circle 210. The connection is substantially symmetric about its axis (160 in FIG. 1).

Because adjacent bolts are staggered axially and oriented in opposite directions, the bolts can be placed closer together than conventionally configured bolts. In other words, the need to be able to position tools between adjacent bolts in order to tighten them is removed as a design constraint, so the bolts can be closer together, resulting in a smaller bolt circle. The smaller bolt circle, in turn, results in smaller-diameter flanges, reduced moment arms for flexion/rotation of the flanges, reduced flange thickness, reduced weight and reduced cost.

It should be noted that the flanges of FIGS. 1 and 2 may be of various different types and may include many different features that are independent of the staggered bolt configuration that is illustrated in the figures. For instance, the flanges may be solid or they may contain multiple pieces, they may be swivel or misalignment flanges, they may have positive or reverse hubs, and so on.

Figure 3:
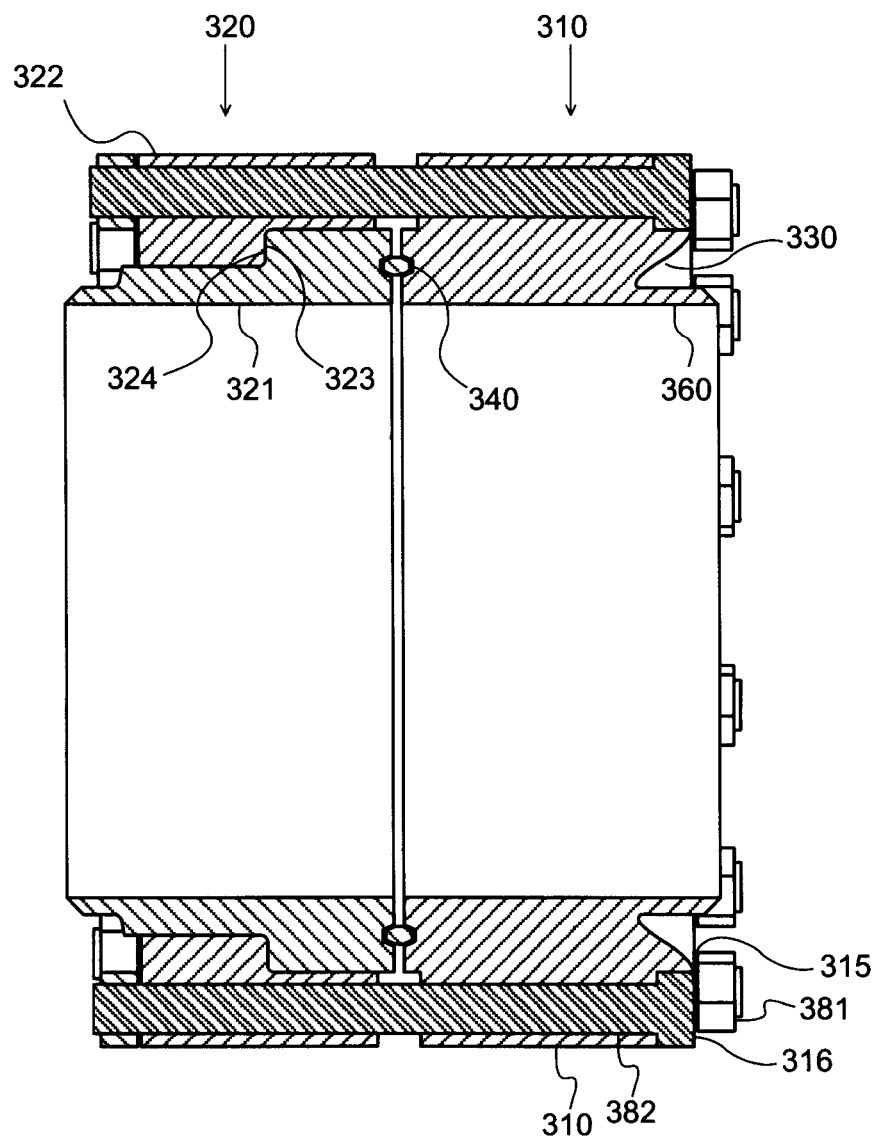
FIG. 3 is a cross-sectional side view of a pipe connection in accordance with one embodiment.

Referring to FIG. 3, a cross-sectional side view of an exemplary connection is shown. The illustrated connection is a swiveling connection that employs a solid bolted flange member 310 and a swiveling flange member 320. Swiveling flange member 320 includes an inner flange portion 321 and a swiveling collar portion 322. Swiveling collar portion 322 rotates around inner flange portion 321 to facilitate alignment of the bolt holes in the collar with the bolt holes in solid flange 310. Swiveling collar 322 is bolted to solid flange 310 to secure the connection. A forward-facing shoulder 323 on swiveling collar 322 contacts a complementary rear-facing shoulder 324 on inner flange portion 321 to secure the inner flange portion against solid flange 310. (Here, "forward-facing" means facing toward the sealing face of the flange, while "rear-facing" means facing away from the sealing face of the flange.) Gasket 340 is positioned between the sealing faces of the flange members to ensure a good seal.

Figure 4:
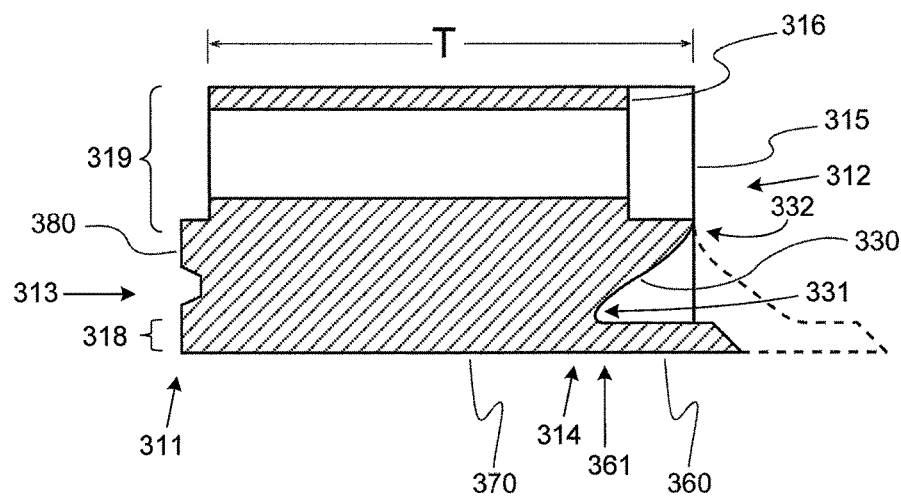
FIG. 4 is a detail view of the hub and weld neck area of one of the flange members of the pipe connection of FIG. 3.

It can be seen in FIG. 3 that the seats for the bolts (e.g., 315, 316) are staggered axially by an amount that is sufficient to eliminate overlap between the nut on one bolt (e.g., 381) and the adjacent bolt (e.g., 382). It can also be seen in FIG. 3 that flange member 310 does not have a conventional hub between the body 370 of the flange member and the weld neck 360. Solid flange member 310 instead employs a reverse spline hub 330 to minimize stresses on the flange resulting from flexion of the flange around gasket 340. This is shown in more detail in FIG. 4.

Figure 5:
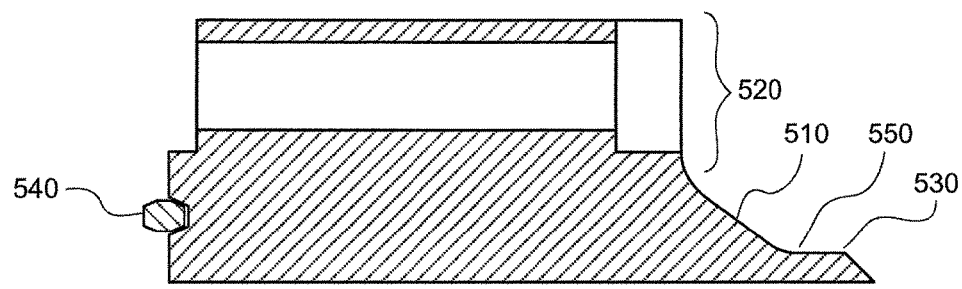
FIG. 5 is a detail view of the hub and weld neck area of a flange member having a conventional positive hub.

In a flange having a conventional hub (e.g., as shown in FIG. 5), a positive hub 510 is formed between the outer, bolted portion of the flange 520 and the weld neck 530. The purpose of the hub is to reduce stress on the weld neck when the flange is secured to another flange, causing it to flex, rotating the bolted portion of the flange 520 (counterclockwise in the figure) around the gasket 540. In the absence of hub 510, the resulting stresses tend to cause the flange to fail where the bolted portion of the flange 520 meets weld neck 530. Hub 510 is intended to reinforce this failure point, but the hub may simply transfer the stresses, causing the flange to fail at the junction between the hub and the weld neck.

In the connection of FIG. 3, flange 310 uses what may be referred to as a reverse hub. Rather than tapering from a larger diameter to a smaller diameter as the distance from the face 380 of the flange increases (a "positive" hub), the diameter of the flange tapers from larger to smaller as the distance from the face 380 of the flange decreases (a "reverse" hub). The conventional, positive hub is shown in FIG. 5, and is illustrated by the dashed line in FIG. 4 for purposes of comparison to the reverse hub.

Reverse hub 330 is referred to above as a reverse spline hub. This indicates that reverse hub 330 does not taper linearly, but instead follows a spline curve which minimizes the stress caused by the rotation of the bolted portion of the flange about the gasket. In this case, the spline curve has been empirically determined to minimize the stress resulting from rotation of the flange about the gasket.

It has been found that the reverse spline hub reduces stresses induced by the rotation of flange 111 so effectively that the flange can be made thinner (i.e., thickness T can be reduced), as a greater amount of rotation of the flange can be tolerated without exceeding stress limits at the junction between the hub and the weld neck. Thus, the reverse spline reduces the size and weight of the connection, both by eliminating the material that would form the hub in a conventional connection, and by eliminating material when the thickness of the flange is reduced.

It should be noted that the embodiments described above are exemplary, and are intended to be illustrative of the many embodiments that are possible. Alternative embodiments may incorporate only selected ones of the features described above, or they may have variations of these features. For example, alternative embodiments may or may not include swiveling flange members or staggered bolt configurations. It should also be noted that alternative embodiments need not use bolts to connect the flanges of the connection, and may instead use connecting means such as clamps to secure the flanges to each other. The various embodiments of the invention may be connected (e.g., welded) to pipe sections, or they may be separate from the pipe sections.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A pipe connection comprising:
a first flange member;
a second flange member; and
means for securing the first flange member to the second flange member;
wherein each of the first and second flange members includes an inner portion and an outer flange portion which are substantially annularly symmetric about an axis through the flange member, wherein the inner portion extends from a sealing face at a forward end of the flange member to a weld neck at a rear end of the flange member, and wherein the outer flange portion surrounds the inner portion;
wherein at least one of the first and second flange members has a reverse hub between the inner portion and the outer flange portion, wherein the reverse hub is annularly symmetric about the axis through the flange member and extends from a rear surface of the outer flange portion to the inner portion, wherein the reverse hub tapers from a larger diameter at the outer flange portion to a smaller diameter at the inner portion as the distance from the hub to the forward end of the at least one flange member decreases, and wherein the reverse hub tapers according to a smooth curve that extends from the outer flange portion to a forward end of the weld neck which is configured to be welded to a pipe section; and
wherein the one of the first and second flange members that has the reverse hub has a constant inner diameter.

2. A pipe connection comprising:
a first flange member;
a second flange member; and
means for securing the first flange member to the second flange member;
wherein each of the first and second flange members includes an inner portion and an outer flange portion which are substantially annularly symmetric about an axis through the flange member, wherein the inner portion extends from a sealing face at a forward end of the flange member to a weld neck at a rear end of the flange member, and wherein the outer flange portion surrounds the inner portion;
wherein at least one of the first and second flange members has a reverse hub between the inner portion and the outer flange portion, wherein the reverse hub is annularly symmetric about the axis through the flange member and extends from a rear surface of the outer flange portion to the inner portion, wherein the reverse hub tapers from a larger diameter at the outer flange portion to a smaller diameter at the inner portion as the distance from the hub to the forward end of the at least one flange member decreases, and wherein the reverse hub tapers according to a smooth curve that extends from the outer flange portion to a forward end of the weld neck which is configured to be welded to a pipe section; and
wherein each of the first and second flange members has a constant inner diameter.

3. A pipe connection comprising:
a first flange member;
a second flange member; and
means for securing the first flange member to the second flange member;
wherein each of the first and second flange members includes an inner portion and an outer flange portion which are substantially annularly symmetric about an axis through the flange member, wherein the inner portion extends from a sealing face at a forward end of the flange member to a weld neck at a rear end of the flange member, and wherein the outer flange portion surrounds the inner portion;
wherein at least one of the first and second flange members has a reverse hub between the inner portion and the outer flange portion, wherein the reverse hub is annularly symmetric about the axis through the flange member and extends from a rear surface of the outer flange portion to the inner portion, wherein the reverse hub tapers from a larger diameter at the outer flange portion to a smaller diameter at the inner portion as the distance from the hub to the forward end of the at least one flange member decreases, and wherein the reverse hub tapers according to a smooth curve that extends from the outer flange portion to a forward end of the weld neck which is configured to be welded to a pipe section; and wherein the forward end of the one of the first and second flange members that has the reverse hub has sealing face that is planar, except for a recess that accommodates a gasket therein.

4. A pipe connection comprising:

a first flange member;

a second flange member; and means for securing the first flange member to the second flange member;

wherein each of the first and second flange members includes an inner portion and an outer flange portion which are substantially annularly symmetric about an axis through the flange member, wherein the inner portion extends from a sealing face at a forward end of the flange member to a weld neck at a rear end of the flange member, and wherein the outer flange portion surrounds the inner portion;

wherein at least one of the first and second flange members has a reverse hub between the inner portion and the outer portion, wherein the reverse hub is annularly symmetric about the axis through the flange member and extends from a rear surface of the outer flange portion to the inner portion, wherein the reverse hub tapers from a larger diameter at the outer flange portion to a smaller diameter at the inner portion as the distance from the hub to the forward end of the at least one flange member decreases, and wherein the reverse hub tapers according to a smooth curve that extends from the outer flange portion to a rear end of the weld neck which is configured to be welded to a pipe section; and wherein the one of the first and second flange members that has the reverse hub has a constant inner diameter.

5. A pipe connection comprising:

a first flange member;

a second flange member; and means for securing the first flange member to the second flange member;

wherein each of the first and second flange members includes an inner portion and an outer flange portion which are substantially annularly symmetric about an axis through the flange member, wherein the inner portion extends from a sealing face at a forward end of the flange member to a weld neck at a rear end of the flange member, and wherein the outer flange portion surrounds the inner portion;

wherein at least one of the first and second flange members has a reverse hub between the inner portion and the outer portion, wherein the reverse hub is annularly symmetric about the axis through the flange member and extends from a rear surface of the outer flange portion to the inner portion, wherein the reverse hub tapers from a larger diameter at the outer flange portion to a smaller diameter at the inner portion as the distance from the hub to the forward end of the at least one flange member decreases, and wherein the reverse hub tapers according to a smooth curve that extends from the outer flange portion to a rear end of the weld neck which is configured to be welded to a pipe section; and wherein the forward end of the one of the first and second flange members that has the reverse hub has sealing face that is planar, except for a recess that accommodates a gasket therein.

* * * * *